United States Patent

Bleiman

[15] 3,646,536

[45] Feb. 29, 1972

[54] HEAD-POSITIONING APPARATUS

[72] Inventor: Lewis W. Bleiman, Northridge, Calif.

[73] Assignee: SLI Industries, Van Nuys, Calif.

[22] Filed: Dec. 4, 1969

[21] Appl. No.: 882,234

[52] U.S. Cl.........340/174.1 C, 179/100.2 CA, 179/100.2 P, 340/174.1 E, 340/174.1 F

[51] Int. Cl.....................G11b 21/12, G11b 5/54, G11b 5/60

[58] Field of Search...............340/174.1 C, 174.1 E, 174.1 F; 179/100.2 CA, 100.2 P, 100.2 MI

[56] References Cited

UNITED STATES PATENTS

| | | | |
|---|---|---|---|
| 3,531,788 | 9/1970 | Brown et al. | 340/174.1 F |
| 3,523,285 | 8/1970 | Alger et al. | 340/174.1 R |
| 3,544,980 | 12/1970 | Applequist et al. | 340/174.1 CA |

*Primary Examiner*—Bernard Konick
*Assistant Examiner*—Steven B. Pokotilow
*Attorney*—Fulwider, Patton, Rieber, Lee & Utecht

[57] ABSTRACT

Apparatus for shifting a plurality of vertically spaced pairs of magnetic heads into a vertical stack of magnetic memory discs and pressing the heads of each pair in opposite directions against the discs above and below the heads, the heads being supported in side-by-side relation on resilient strips with an actuator between the strips for shifting the heads into engagement with the discs. The actuator comprises an elongated spring arm with two laterally projecting wings that are oppositely inclined from the horizontal when the spring is free, each wing having a follower on its tip engageable with a cam along the path of the tip to shift the wings away from the associated discs and stress the arms during retraction of the heads and to release the wings to the action of the springs during insertion.

14 Claims, 7 Drawing Figures

INVENTOR
LEWIS W. BLEIMAN
BY
Fulwider, Patton, Rieber
Lee, and Utecht
ATTORNEYS

INVENTOR.
LEWIS W. BLEIMAN
BY Fulwider, Patton, Rieber Lee, and Utecht
ATTORNEYS

HEAD-POSITIONING APPARATUS

BACKGROUND OF THE INVENTION

This invention relates to apparatus for positioning heads relative to magnetic discs in a disc memory system to read stored information from selected tracks on the discs, and relates more particularly to the manner in which the heads are pressed against the discs after insertion in a stack and subsequently are released from the discs preparatory to withdrawal from the stack.

In magnetic disc memory systems, one type of disc and head arrangement that is widely used in the industry utilizes vertically spaced magnetic discs with recording tracks on both sides, and heads that are supported on a reciprocating actuator for movement of two heads between each pair of adjacent discs. The heads are carried on the ends of elongated, resiliently flexible strips that are supported in side-by-side relation for insertion between two discs, one head facing upwardly to engage the underside of the upper disc and the other facing downwardly to engage the upper side of the lower disc.

After the heads have been inserted between the discs, they are shifted in opposite directions and pressed against the respective discs to read recorded information from the tracks, the heads being moved back and forth within the stack into alignment with selected tracks and then being shifted back out of engagement with the discs for removal from between the discs. When the heads are retracted, different stacks of discs may be indexed into alignment with the heads.

SUMMARY OF THE INVENTION

The present invention resides in a novel apparatus for shifting such heads into engagement with, and pressing them against, the associated discs after insertion of the heads into the stack of discs, and subsequently releasing the pressure and disengaging the heads for removal of the heads from the stack, the apparatus being relatively simple and inexpensive in construction and smooth and highly reliable in operation. Moreover, the actuation of the mechanism may be accomplished solely as an incident to the in-and-out movements of the heads relative to the stack.

In the preferred embodiment of the invention, the head-applying force is developed in an actuator including a normally twisted spring arm disposed between two head-supporting strips and having laterally projecting wings, one of which extends under the head that is engageable with the upper disc and the other extending over the head that is engageable with the lower disc. When the spring arm is free, the wings are inclined toward the associated discs, one upwardly and one downwardly, to press the respective heads against the discs, this being the normal, disc-reading condition while the heads are between the discs. During retraction of the heads from between the discs, each wing is cammed away from its associated disc toward a central reference plane, and the head-supporting arms are permitted to return the heads to their normal positions spaced from the discs. Similarly, as the heads are reinserted, the wings are released to return to the inclined disc-reading position.

Preferably, the cams are stationarily mounted on the apparatus along the paths of the heads during retraction from the stack, and cam followers are formed on the tips of the wings, the tips being positioned to lead the head-applying portions of the wings during retraction so as to disengage the heads before the latter are withdrawn, and to release the heads for reengagement only after they have been inserted in the stack. An alternative form of the actuator supports the wings in a normally inclined attitude on an inclined flat spring.

Other features, objects and advantages of the present invention will become apparent from the following detailed description, taken in conjunction with the accompanying drawings.

DETAILED DESCRIPTION

Figure 1:
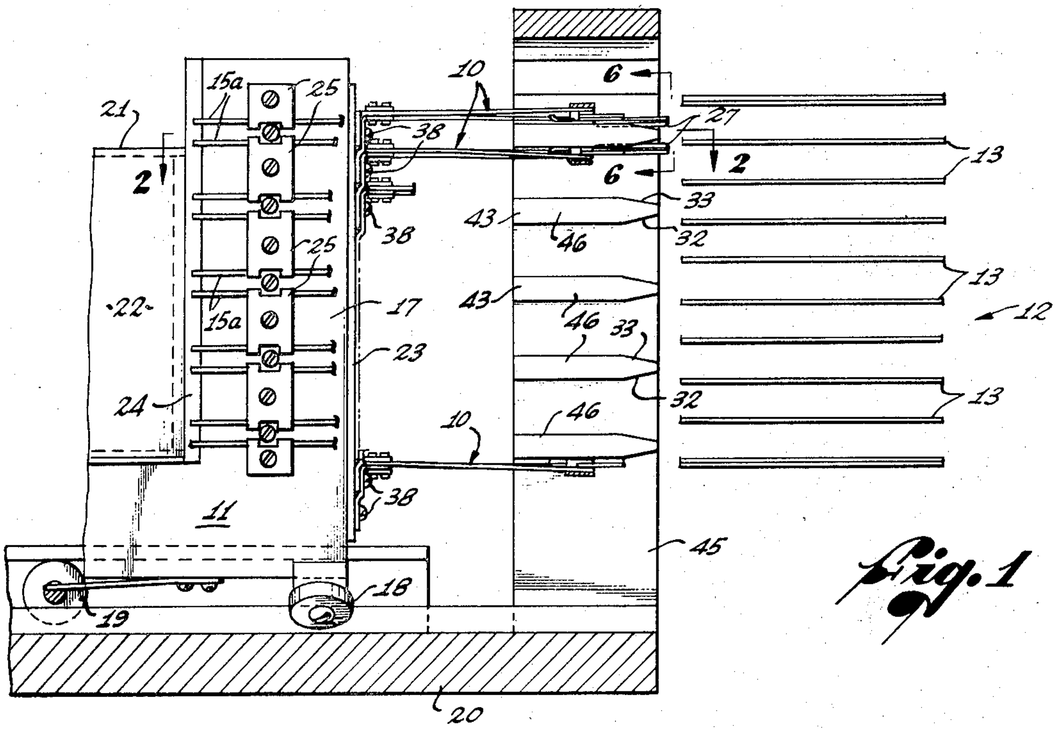
FIG. 1 is a fragmentary cross-sectional view taken in a longitudinal plane through an apparatus embodying the novel features of the present invention.

As shown in the drawings for purposes of illustration, the invention is incorporated in a magnetic disc memory system including a plurality of head assemblies 10 arranged in vertically spaced relation on a carriage 11 for moving the head assemblies back and forth relative to a vertical stack 12 of magnetic memory discs 13 and selectively positioning each head assembly either in a retracted position beside the stack or in alignment with one of several concentric annular tracks on an associated disc to read recorded information on the aligned track. The head assemblies are supported in pairs on side-by-side, resiliently flexible strips 14 and 15 projecting cantilever fashion to the right from an upright post 17 of the carriage 11, which is supported by bearings 18 and 19 movable along the base 20 of a reciprocating actuator 21. The actuator includes a driving member 22 projecting to the left from the post 17 and operable when energized to move the carriage along the base toward and away from the stack 12 between a plurality of precisely located positions determining the positions of the heads within the stack.

Figures 2, 3, 4:
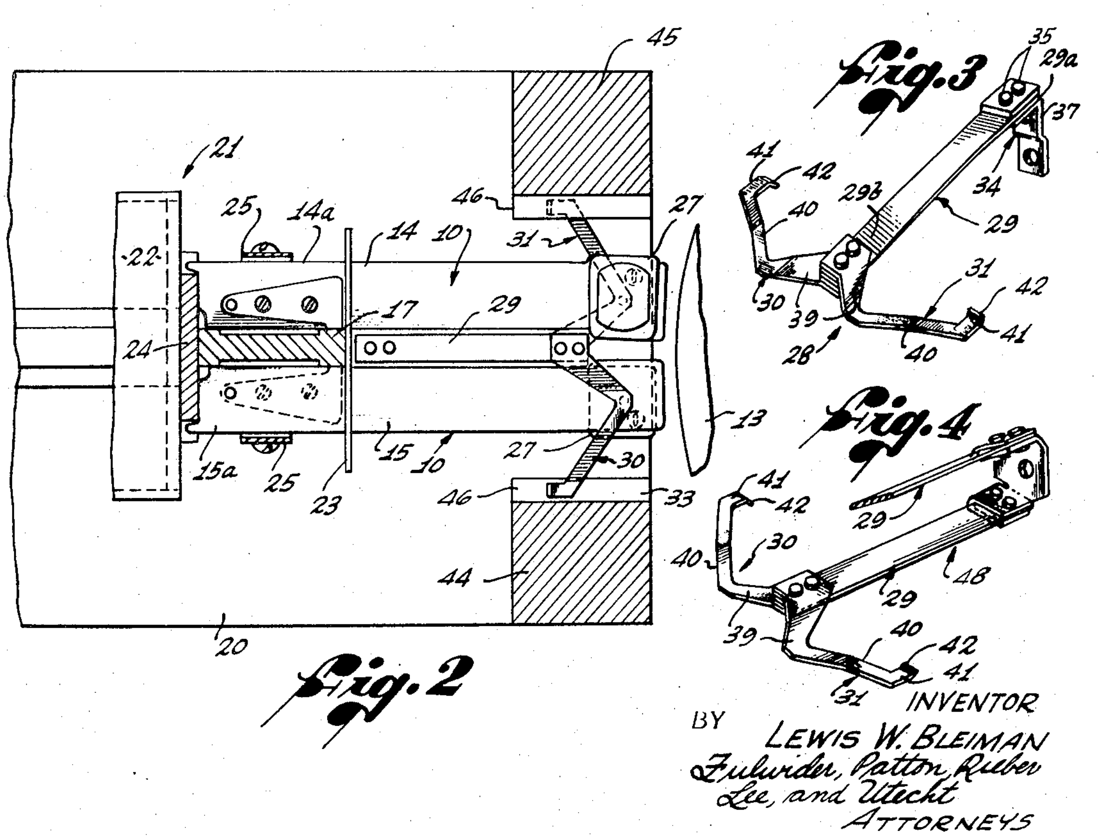
FIG. 2 is a fragmentary cross-sectional view taken in a horizontal plane in FIG. 1, substantially along the line 2—2 thereof.
FIG. 3 is a perspective view of an actuator constructed in accordance with the present invention.
FIG. 4 is a view similar to FIG. 3 showing an alternative form of the actuator.
Figure 5:
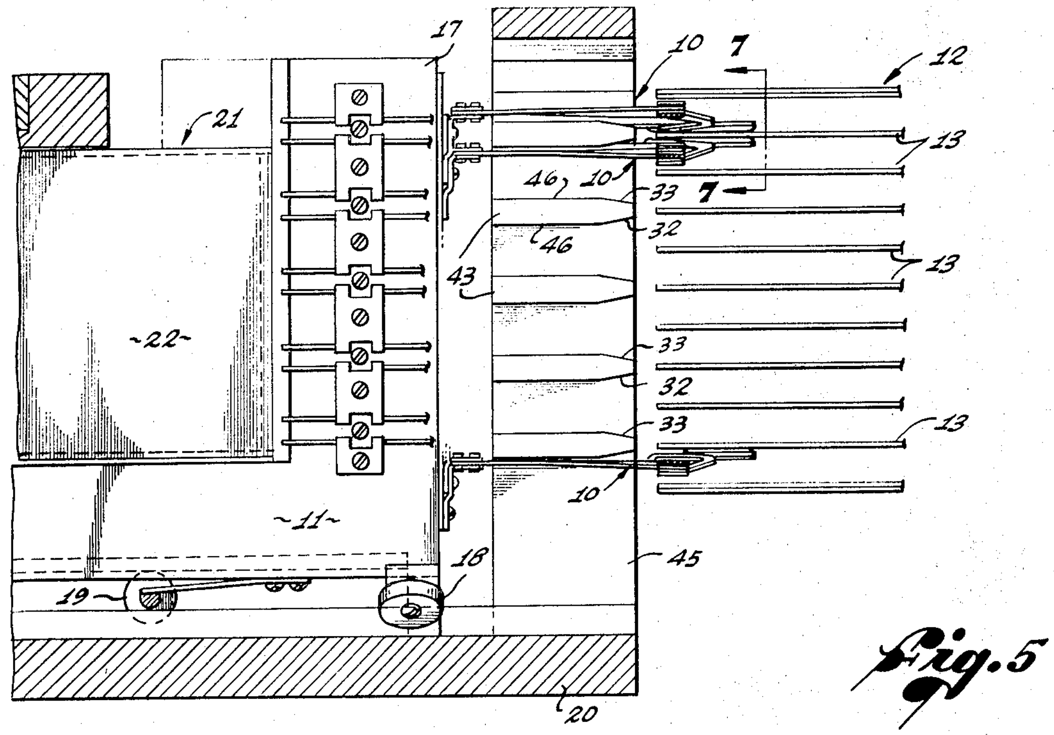
FIG. 5 is a view similar to FIG. 1 with parts in moved positions to illustrate an extended condition in which the heads are within the stack and in engagement with the discs.

As shown most clearly in FIGS. 1 and 2, the left or rear end portions **14*a* and 15*a* of the flexible supporting strips 14, 15, of each pair of head assemblies 10 are disposed in a common, generally horizontal plane and project rearwardly through a mounting plate 23 on the front edge of the post 17, the rear ends being anchored in notches in a plate 24 fastened to the rear edge of the post. Conventional brackets 25** clamp the strips against the sides of the post with the free end portions of the strips projecting forwardly, cantilever fashion, in horizontally spaced relation from the post.

On the free end of each supporting strip 14, 15 is a magnetic head 27, one being mounted on top of the associated strip (the upper strip as viewed in FIG. 2) for engagement with a disc 13 above the strip, and the other being mounted on the underside of its strip for engagement with a disc below the strip. The heads are of basically conventional construction and thus are shown only generally herein. Between each pair of supporting strips is an actuator 28 for shifting the heads on the free ends of the strips alternately toward the associated discs 13 after the heads have been inserted into the stack, thereby to press each head into engagement with the disc for reading of information recorded thereon, and then away from the discs to disengage the heads preparatory to removal of the heads from the stack.

In accordance with the present invention, the actuator 28 has a spring arm 29 which may be fixed to the post 17 at its rear end and which carries, adjacent its forward end, a pair of laterally projecting wings 30 and 31 that normally are inclined at preselected angles in opposite directions from the horizontal when the spring arm is free, the wings being disposed respectively above and below the strips 14 and 15 in FIG. 2 to urge the heads toward the associated discs 13 when the spring arm is free. To disengage the heads from the discs, stationary cams 32 and 33 are provided along the paths of the wings during retraction of the heads to shift the wings away from the discs and into generally horizontal attitudes, thereby twisting and loading the spring arm while permitting the supporting strips to flex back to their normal positions in which the heads are spaced from the discs. During subsequent insertion of the heads into the stack, the cams release the wings and thus permit the spring arm to flex back toward its free condition while shifting the heads toward, and pressing them against, the discs.

With the foregoing arrangement, the actuation of the heads 27 into engagement with the discs 13 is accomplished entirely as an incident to the back-and-forth movement of the heads relative to the stack 12, with a structurally simple and inexpensive actuator 28 having no moving parts other than the spring-supported wings 30 and 31. Moreover, the actuator is completely reliable in service use.

In the presently preferred form shown most clearly in FIGS. 1–3, the spring arm 29 is a flat spring strip that is permanently twisted between its ends, from a horizontal rear end portion *29a* (FIG. 3) anchored in a bracket 34 on the post 17 to an inclined front end portion *29b* upon which the wings 30 and 31 are mounted. The rear end preferably is riveted at 35 to the bracket, which has a depending leg with a forwardly offset upper portion 37 for receiving the lower end of the next higher bracket on the post. Two screws 38 (FIG. 1) secure each depending leg to the post and key the bracket against rotation relative to the post.

Each of the wings 30, 31 is V-shaped, as will be seen in FIGS. 2 and 3, having a forwardly inclined inner end portion 39 and a reversely inclined outer end portion 40 terminating in a tip portion 41 forming a cam follower that is generally parallel to the spring arm 29 and has a flat surface for engaging the associated cam 32, 33. The free ends 42 of the tips are inclined away from the associated cam to form leading beveled surfaces for smoothly engaging the cams during retraction of the heads from the stack.

The cams 32, 33 for operating each actuator 28 are oppositely inclined surfaces on the forward end portions of two lugs 43 projecting laterally into the paths of the cam followers 41 of the wings from two upright columns 44 and 45 (see FIGS. 2, 6 and 7) disposed on opposite sides of the head assemblies when the latter are retracted. The cam 32 for engaging and lowering the upwardly inclined wing is on the underside of a lug above the path of this wing, and the cam 33 for engaging and raising the downwardly inclined wing is on the upper side of a lug below this wing. As will be seen in FIGS. 1 and 5–7, each lug within the vertical series of lugs has both downwardly and upwardly inclined surfaces 32 and 33 on its forward end to serve actuators both above and below the lug, and has a flat holding surface 46 beyond each inclined surface.

Herein, the wings 30 and 31 engage the adjacent sides of the heads 27 on the supporting strips 14 and 15 to apply the actuating forces directly to the heads through a dimple 47 (FIG. 6 and 7) on each head engaging the associated wing adjacent the vertex of each V of the wing. As will be seen in FIGS. 6 and 7, each wing is bent on opposite sides of a central section including the vertex of the V to engage only the dimple on the associated head, the portions of the wing on opposite sides of the central section being substantially parallel.

To counterbalance the forces applied to the discs 13 when the heads 27 are in engagement with the discs, the direction of inclination of the wings 30 and 31 is reversed between each successive pair of discs. Thus, the force exerted by a downwardly inclined wing above a disc acts directly in opposition to the force applied by an upwardly inclined wing below the disc, the two heads above and below the disc being aligned to avoid deformation of the disc.

An alternative embodiment of the actuator is shown at 48 in FIG. 4, wherein corresponding parts are indicated by the same reference numerals. In this instance, the spring arm 29 is normally flat and untwisted along its length, but is disposed, when free, in a plane that is inclined relative to the horizontal. The wings 30 and 31 are mounted, as before, on the free end portion of the arm and are inclined in the same plane as the free end portion. Thus, the cams 32 and 33 cooperate with the followers 41 on the ends of the wings to twist, wind up, and load the spring arm 29 during retraction of the heads 27 from the stack 12, and to release the followers to permit untwisting or unwinding of the spring arm during insertion of the heads, thereby permitting the spring arms to rotate back toward the free positions while shifting the heads into engagement with the associated discs.

The mounting bracket shown in FIG. 4 is designed to mount two vertically spaced actuators 48 on the post 17 with the spring arms 29 in oppositely inclined planes. With this arrangement, the reactive forces applied through the arms to the bracket counterbalance each other, so only one fastener is required to secure the bracket to the post. It will be apparent that the angle of inclination of the wings 30 and 31 in each embodiment, when the spring arm is free, is selected so that the spring arm remains stressed when the associated heads 27 are pressed against the discs 13, thus applying a preselected approximate loading force to the heads. In other words, the angle of inclination when the arms are free is greater than the angle when the heads are engaged with the discs. Of course, the force exerted by the spring arms is sufficiently greater than the resistance offered by the resilient supporting strips 14 and 15 to obtain the desired loading pressure.

Figure 6:
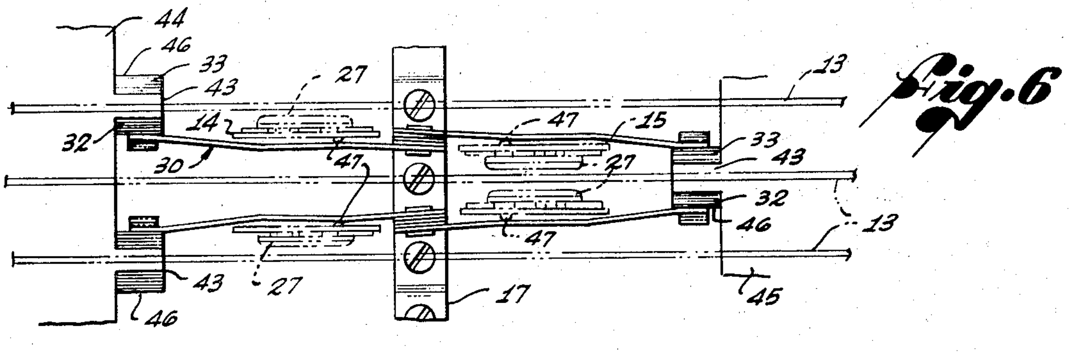
FIG. 6 is an enlarged fragmentary cross section taken substantially along the line 6—6 of FIG. 1 with the heads retracted from the stack.
Figure 7:
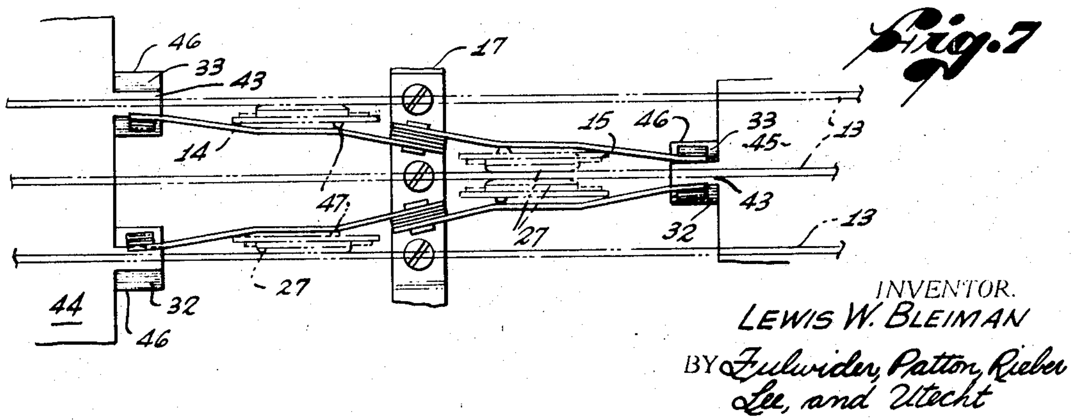
FIG. 7 is an enlarged fragmentary cross section similar to FIG. 6 with the heads extended into the stack, this view being taken substantially along the line 7—7 of FIG. 5.

While the manner of operation of the apparatus constituting the present invention should be apparent from the foregoing detailed description, a summary of the operation will emphasize more clearly the features and advantages of the apparatus. Assuming that a selected stack 12 of discs 13 is positioned in front of the apparatus as shown in FIG. 1, and further that the heads 27 are in the retracted positions beside the stack, the head assemblies are positioned as shown in FIG. 6 with the followers 41 in engagement with the flat holding surfaces 46 of the cams so that the wings 30 and 31 are held substantially horizontal and the supporting strips 14 and 15 above and below the wings also are substantially horizontal. Thus, the spring arms 29 are stressed and the heads 27 are spaced from the planes of the associated discs in condition for insertion into the stack.

Operation is initiated by energizing the drive member 22 in a direction to advance the carriage 11 toward the stack 12, to the right in FIG. 1. During the initial movement, the followers 41 slide along the holding surfaces 46 toward the stack, maintaining the wings 30, 31 in the positions shown in FIG. 6 until the followers begin to slide along the cams 32, 33. When this occurs, the stressed spring arms 29 begin to unwind, maintaining the followers in engagement with the cams and thus permitting the wings to swing toward their inclined positions and to shift the associated heads toward the discs above and below the heads.

The position of the cams 32 and 33 along the paths of the followers 41 is such that the heads 27 are inside the stack 12 before the wings clear the forward ends of the cams. Thus, the wings are not released to the full action of the spring arms 29 until the heads are properly positioned for engagement with the discs. The longitudinal motion of the carriage 11 continues until the heads are aligned with selected tracks of the discs, at which time and movement of the carriage is stopped.

It should be noted that the motions of the heads 27 are extremely rapid and typically limited to a relatively narrow range of precisely located positions. Each subsequent shift of the heads within a given stack 12 may be accomplished without withdrawing the heads, and thus without changing the condition of the actuators 28, which simply maintain the loading of the heads as the latter slide from one magnetic track to another.

When the heads 27 are to be withdrawn from the stack 12, the carriage 11 is shifted back to the left to slide the heads to the left along the discs 13, simultaneously shifting the wings 30 and 31 back toward the cams 32 and 33. Before the heads leave the stack, however, the followers 41 engage the cams, and the latter resume control of the positions of the wings. As the followers slide along the cams, the wings are twisted toward the generally horizontal reference plane between the discs, winding up and loading the spring arms 29 progressively until the followers reach the holding surfaces 46. At the same time, the supporting strips 14 and 15 are permitted to return to their relaxed condition and to shift the heads away from the discs. When the apparatus reaches the retracted position shown in FIG. 1, the carriage is stopped and thereafter remains stationary, in readiness for reinsertion in the stack 12, or insertion in another stack that has been indexed into alignment with the heads.

From the foregoing, it will be seen that the present invention provides a novel apparatus for shifting one or more heads into and out of alignment with a memory disc, and engaging and disengaging the heads 27, automatically as an incident to the insertion and retracting motions of the heads relative to the discs. This apparatus is relatively simple and inexpensive in construction and highly reliable in operation, making use of spring arms which support the wings in normally inclined positions and which are loaded by stationary cams along the path of insertion and retraction of the wings. It also will be evident that, while a particular embodiment and a specific use have been illustrated and described, various modifications and other uses are within the spirit and scope of the invention.

I claim:

1. In an apparatus for shifting a plurality of pairs of heads into and out of a stack of spaced memory discs and moving the heads of each pair oppositely into engagement with the discs on opposite sides sides thereof, said apparatus including a carriage with each pair of said heads carried on side-by-side, resilient head-supporting strips projecting cantilever fashion from the carriage, the improvement comprising:

an actuator for each pair of said heads having an elongated spring arm disposed between said supporting strips and secured at one end to said carriage, and two wings projecting laterally from the free end portion of said spring arm and extending across said heads on opposite sides thereof, said wings being inclined in opposite directions from said spring arm, relative to a central reference plane, when said arm is free, thereby to shift said heads in opposite directions toward the respective discs, and to press the heads against the discs;

and cams stationarily mounted along the path of said wings during movement of the heads into and out of said stack and operable to shift said wings toward said reference plane during movement out of the stacks and to release the wings for movement toward the discs during movement into the stack, thereby engaging and disengaging the heads automatically as an incident to such movements.

2. The improvement defined in claim 1 in which said wings have cam followers on the free ends thereof for engagement with said cams.

3. The improvement defined in claim 1 in which said spring arm is permanently twisted between its ends, and said cams untwist, and thereby load, the arm during movement of the wings toward said plane.

4. The improvement defined in claim 1 in which said spring arm is a flat strip disposed in an inclined plane, and said wings are disposed in said inclined plane when said arm is free.

5. The improvement defined in claim 1 in which each wing is inclined forwardly from said spring arm to a central section for engaging said heads, and is inclined rearwardly from said central section to the free ends of the wings, said free ends have followers thereon for engaging said cams.

6. The improvement defined in claim 1 in which said wings are inclined at a greater angle when said spring arm is free than when said heads are in engagement with said discs, whereby the spring arm applies a preselected approximate loading force to the engaged heads.

7. The improvement defined in claim 6 in which said followers are portions of said wings generally parallel to said spring arm.

8. The improvement defined in claim 6 in which said central sections are offset from the incline of said wings, and said heads are formed with dimples engaging said central sections.

9. Apparatus for shifting a head into and out of alignment with a memory disc and moving the head into and out of engagement with the aligned disc, said apparatus having, in combination:

a carriage movable toward and away from said disc;

a head disposed between said carriage and said disc and positioned for movement between a retracted position and an extended position in which said head is aligned with one side of the disc;

means supporting said head for movement with said carriage and also for movement toward and away from said one side;

an actuator including an elongated spring arm secured at one end to said carriage for movement therewith, and extending forwardly therefrom alongside said supporting means, and a wing on said spring arm projecting laterally therefrom across said head, said wing being mounted on said spring arm to be inclined toward said one side of said disc when said arm is free, and to press said head against the disc with a preselected approximate loading force;

and means positioned along the path of said actuator to engage the latter and shift said wing away from said disc as the head is moved along the disc by movement of said carriage away from said disc, thereby to unload the head while stressing said spring, the last-mentioned means also releasing said actuator to permit said spring arm to shift said head toward said disc during movement of said head along said disc by movement of said carriage toward the disc.

10. Apparatus as defined in claim 9 in which said supporting means is an elongated, resiliently flexible strip for normally holding said head in a position spaced from said disc, and said wing projects across the side of said head opposite said disc.

11. Apparatus as defined in claim 9 in which said spring is permanently twisted when free, and is untwisted and progressively stressed by said last-mentioned means.

12. Apparatus as defined in claim 9 in which said spring is a flat strip disposed in an inclined plane relative to said disc, said wing also being disposed in said inclined plane so as to twist and stress said spring as the wing is moved away from the disc.

13. Apparatus as defined in claim 9 in which said last-mentioned means comprises a follower on said wing and a cam stationarily positioned along the path of said follower during movement of said actuator by said carriage, said cam being shaped to shift said follower away from said disc during movement of said carriage away from the disc, and to permit the wing to move toward the disc in the opposite direction of actuator movement.

14. Apparatus as defined in claim 9 in which two of said heads are supported in side-by-side relation on two resiliently flexible supporting strips projecting toward said disc from said carriage with said spring arm disposed between said strips and with one wing projecting laterally from said arm across opposite sides of said strips to shift said heads in opposite directions, said last-mentioned means including a cam for each of said strips.

* * * * *